June 10, 1924.

H. E. MOFFAT

FILTER

Filed Oct. 31, 1921

INVENTOR.
Henry E. Moffat.
BY Whittemore, Hulbert, Whittemore, and Belknap
ATTORNEYS.

Patented June 10, 1924.

1,496,995

UNITED STATES PATENT OFFICE.

HENRY E. MOFFAT, OF HIGHLAND PARK, MICHIGAN, ASSIGNOR OF ONE-SIXTH TO GEORGE W. MARSHALL, ONE-SIXTH TO GEORGE L. MARSHALL, AND ONE-SIXTH TO GAYLORD L. MARSHALL, ALL OF DAYTON, OHIO.

FILTER.

Application filed October 31, 1921. Serial No. 511,661.

*To all whom it may concern:*

Be it known that I, HENRY E. MOFFAT, a subject of the King of Great Britain and Ireland, residing at Highland Park, in the county of Wayne and State of Michigan, have invented certain new and useful Improvements in Filters, of which the following is a specification, reference being had therein to the accompanying drawings.

The invention relates to filters and relates particularly to a filter for use in water heating and purifying apparatus.

It is an object of the invention to provide a filter through which a normal flow of water is maintained from a settling chamber to a pure water chamber and to provide a relief opening under control of a closure automatically unseated to establish a passage between the two said chambers independently of said filter when the latter becomes so clogged through neglect or other causes as to prevent a normal flow and create differential water levels in the two chambers.

A further object of the invention is to provide a filter employing a filter element formed of fabrics mounted in such a manner as to provide for their ready removal and renewal.

A still further object is to prevent the sediment accumulated upon the bottom of the settling tank from being carried against the filtering element by the flow of water therethrough.

These and various other objects are attained by the invention through the employment of certain structural features and an arrangement of parts hereinafter fully described and illustrated in the accompanying drawings, wherein:—

Figure 1:
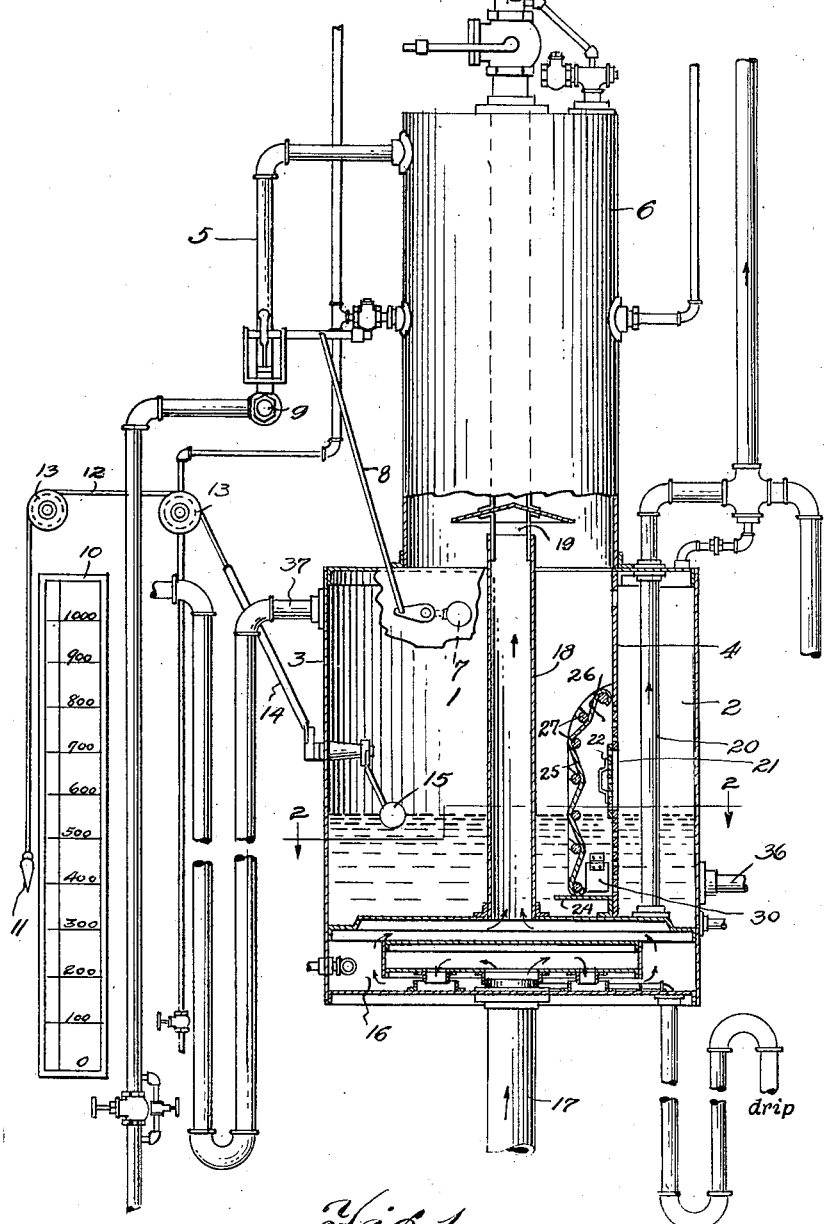
Figure 1 is a view in front elevation and partial section of a water heater and purifier equipped with the improved filter.
Figure 2:
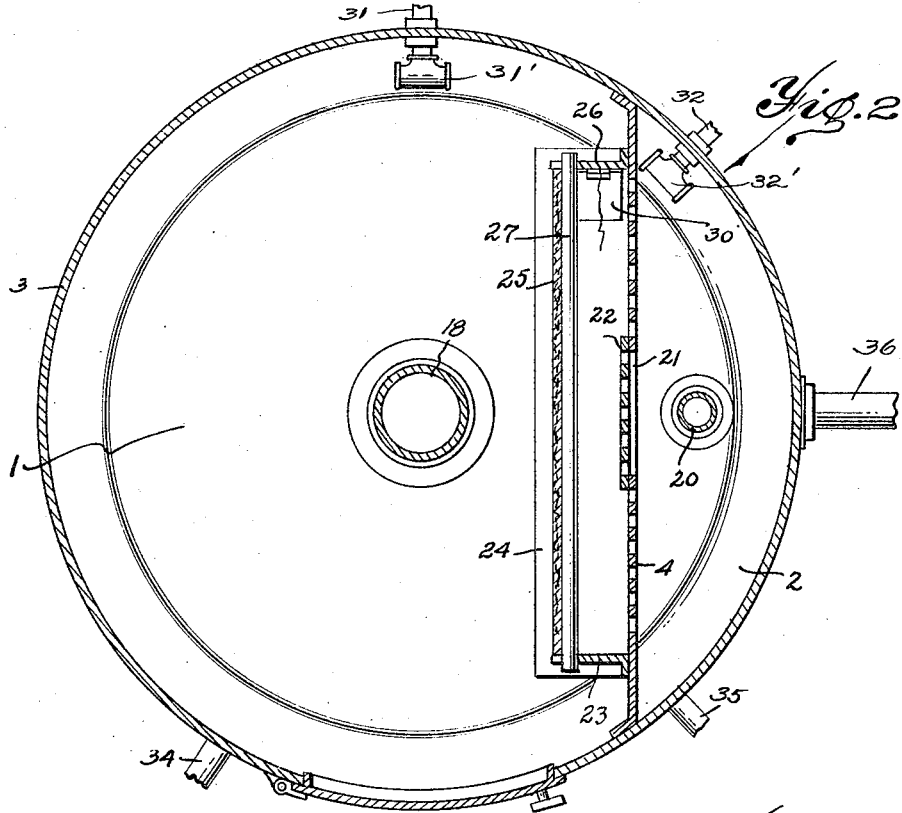
Figure 2 is a cross section taken upon line 2—3 of Figure 1.
Figure 3:
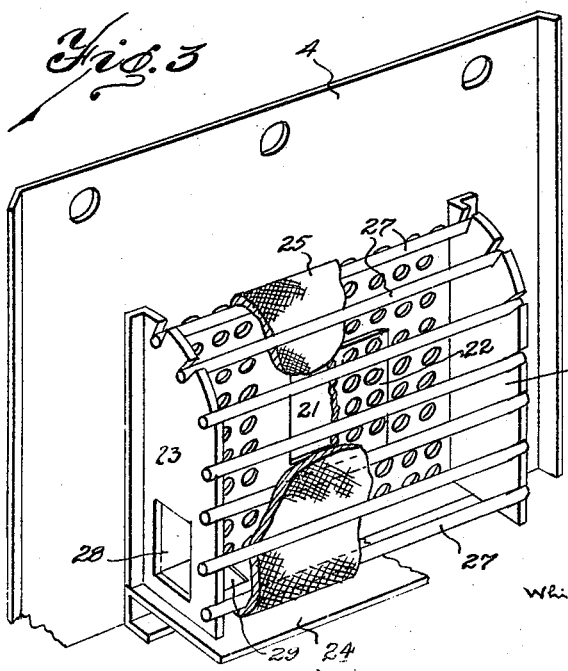
Figure 3 is a perspective view of the filter removed from the apparatus shown in Figure 1.
Figure 4:
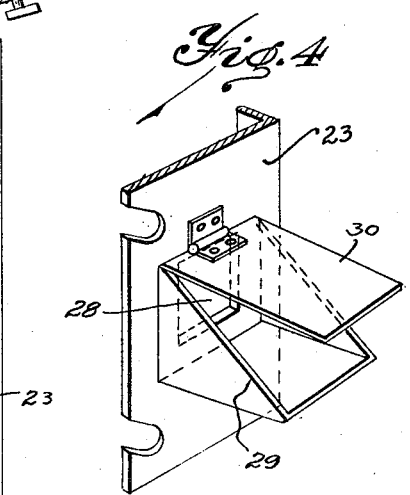
Figure 4 is a fragmentary perspective view of a relief opening past the filter and an automatic closure therefor.

In these views, the reference characters 1 and 2 respectively designate a settling chamber and a pure water chamber formed within the cylindrical tank 3, one at each side of a partition 4. A supply of water to the settling chamber either intermittent or continuous is derived from any suitable source. As shown in the drawings, a pipe 5 delivers water to a casing 6 surmounting the tank 3 and containing purifying and heating means which are no features of the present invention. A substantially constant water flow is normally maintained in the tank 3 by means of a float 7 acting through a connecting rod 8 to control a valve 9 in the water supply pipe 5. 10 is a scale upon which may be read the contents of the tank 3, the indication being furnished by a weight or plumb-bob 11 constrained to travel in proximity to said scale and carried by a cord 12 extending over pulleys 13 to an arm 14 pivotally actuable by the float 15 within the settling chamber. Such an indicator may be arranged at a point remote from the tank, if desired.

Below the tank 3 there is provided a steam purifying chamber 16 to which exhaust steam may be delivered by a pipe 17 and from which said steam flows to the casing 6 through a pipe 18 rising through the settling chamber and heating the same in conjunction with said chamber 16. A further heating effect is exercised by filling the space within the settling chamber above the water level with exhaust steam discharging from an opening 19 in the pipe 18. Within the chamber 16, there is disposed any suitable means for removing from the exhaust steam any lubricating oil that may have been entrained by said steam. The pure water chamber 2 is also heated by a flow of exhaust steam from the chamber 16 through the pipe 20 centrally rising through said chamber, said pipe being extended to any desired apparatus wherein the remaining heat units of the steam may be utilized.

The central portion of the partition 4 is perforated and is further formed with a door opening 21. Normally said opening is closed by a perforated sliding closure 22. Plates 23 and 24 projecting into the settling chamber from the partition 4, respectively at each end of the perforated portion and below the same coact with a filter member 25 to form a chamber 26 through which the water accumulated in the settling chamber is compelled to flow in passing to the purified water chamber 2. The filtering member is formed preferably of one or more thicknesses of burlap or some similar fabric, the same being secured to a plurality of rods 27 detachably mounted in the plates 23 adjacent the free edges thereof.

In one of the plates 23, there is formed a relief opening 28 around which is formed an inclined seat 29 for a check valve 30 hinged at its upper edge to said plate. Owing to its inclined position, the valve 30 is normally seated by its own weight. If, however, the hydrostatic pressure within the settling chamber exceeds to a predetermined degree that within the chamber 26, said closure is forced open, affording a passage between the two chambers 1 and 26 independent of the filter member. Such differential hydrostatic pressure as will cause the valve 30 to open will be created only when, through neglect or other cause, the filtering element 25 has been permitted to become so clogged with impurities as to prevent a normal flow of water therethrough. Under such conditions, the water in the settling chamber will assume a higher level than in the chamber 26 (and pure water chamber) resulting in the afore-mentioned differential pressures upon the valve 30. The bottom element 24 of the chamber 26 is spaced some distance above the bottom of the settling chamber 1, and furthermore projects somewhat beyond the lower edge of the filtering element 25. This arrangement is for the purpose of preventing sediment from being drawn from the bottom of the settling chamber against the lower portion of the filtering element. 31 and 32 are flush pipes respectively entering the lower portions of the chambers 1 and 2 and provided within said chamber, adjacent the cylindrical wall of the tank 3, with T-heads 31' and 32'. Thus in the operation of flushing, said cylindrical wall of the tank acts as a deflector to spread the flushing water over the entire bottom surface of the tank. 34 and 35 are drain pipes through which the flushing water may be drawn off from the chamber 1 and 2 respectively. 36 is a pipe through which the hot purified water is delivered from the tank 2 to any desired point of use. 37 is an over-flow pipe in communication with the upper portion of the settling chamber.

The perforations of the partition 4 afford a sufficiently free passage normally for the pure water, but will stop any pieces of burlap from entering the pure water chamber in case the filtering member 25 for any reason, breaks down.

While the described filtering arrangement is shown conjoined with water heating and purifying apparatus, it is to be understood that the invention is adapted for use with either hot or cold water and either with or without any of the auxiliary apparatus shown in the drawing.

What I claim as my invention is:

1. In a device of the character described, the combination with a settling chamber and a pure water chamber, a passage providing for a normal flow from the former to the latter chamber, a filtering element through which said normal flow is maintained, and a normally closed relief passage between the two said chambers opened upon establishment of differential hydrostatic pressures within said chambers.

2. In a device of the character described, the combination with a settling chamber and a pure water chamber, of a passage normally providing for a flow from the former to the latter chamber, a filter member through which said flow is maintained, a relief passage between said chambers, and a gravity seated valve normally closing said passage and adapted to be opened by differential hydrostatic pressures within the two said chambers.

3. In a device of the character described, the combination with a settling chamber and a pure water chamber, of a passage connecting the same, a filtering member normally obstructing said passage, a plurality of detachable rods forming a mounting for said filtering member, and a normally closed relief passage between said chambers, opening through differential hydrostatic pressures in the two chambers.

4. In a device of the character described, the combination with a settling chamber and a pure water chamber, of a partition between the same having a perforated portion, plates projecting from said partition within the settling chamber, one of said plates having a relief passage, a filtering member forming with said plates a small extension of the pure water chamber within the settling chamber and a closure for said relief passage adapted to automatically open under differential hydrostatic pressures within the settling chamber and pure water chamber.

5. In a device of the character described, the combination with a settling chamber and a pure water chamber and a partition therebetween having a perforated portion, of plates projecting into the settling chamber at each end of said perforated portion, a plate projecting into the settling chamber below said perforated portion and spaced above the bottom of said settling chamber, and a filtering member coacting with said plates to form an extension of the pure water chamber within the settling chamber through which extension the water is compelled to flow to the pure water chamber.

6. In a device of the character described, the combination with a settling chamber, a pure water chamber, and a partition between the same, said partition having openings in its upper portion for the equalization of steam or air pressures in the two said chambers, of means for introducing exhaust steam into the upper portion of the settling chamber to heat the contents thereof, a filtering member controlling a normal passage through said partition and an automatic closure controlling a relief passage through said partition.

7. In a device of the character described, the combination with a settling chamber, of a substantially cylindrical form, of a flush pipe entering said chamber adjacent the bottom thereof and provided adjacent the cylindrical wall of said chamber with a head discharging at an acute angle against said wall whereby said wall functions as a deflector to spread the discharge from said head upon the bottom of said chamber.

8. In a device of the character described, a settling chamber and an adjacent pure water chamber, a passage providing for a flow from the former to the latter, a filtering element in said passage, a screen spaced from said filtering element obstructing said passage beyond said element, said screen having an opening therein and a sliding closure controlling said opening.

9. In a device of the character described, the combination with a settling chamber and a pure water chamber, of a passage connecting the same, a filtering member normally obstructing said passage, and a plurality of independently detachable rods forming a mounting for said filtering member.

10. In a device of the character described, the combination with a settling chamber and a pure water chamber, of a passage connecting the same, a filtering member normally obstructing said passage, and a plurality of independently detachable rods forming a mounting for said filtering member and engaging at opposite sides of said member.

11. In a device of the character described, the combination with a settling chamber and a pure water chamber, of a passage connecting the same, notched supports at opposite sides of said passage, rods extending between said supports across the passage and detachably engaging in said notches, and a filtering member mounted upon said rods.

In testimony whereof, I affix my signature.

HENRY E. MOFFAT.